(12) United States Patent
Hendrickson et al.

(10) Patent No.: US 7,546,018 B2
(45) Date of Patent: Jun. 9, 2009

(54) FIBER OPTIC CABLING FOR MULTI-DWELLING UNIT (MDU) AND COMMERCIAL BUILDING DEPLOYMENTS

(75) Inventors: Daniel Hendrickson, Roswell, GA (US); Peter A. Weimann, Atlanta, GA (US); Hongbo Zhang, Duluth, GA (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 11/891,553

(22) Filed: Aug. 10, 2007

(65) Prior Publication Data
US 2008/0170824 A1 Jul. 17, 2008

Related U.S. Application Data

(63) Continuation-in-part of application No. 11/728,785, filed on Mar. 27, 2007, now Pat. No. 7,400,814.

(60) Provisional application No. 60/880,169, filed on Jan. 13, 2007.

(51) Int. Cl.
*G02B 6/00* (2006.01)
(52) U.S. Cl. .................. 385/135; 385/147; 385/134
(58) Field of Classification Search ......... 385/134–137, 385/147
See application file for complete search history.

(56) References Cited

U.S. PATENT DOCUMENTS

| 4,913,369 A | 4/1990 | Lia et al. |
| 4,976,510 A | 12/1990 | Davila et al. |
| 5,022,600 A | 6/1991 | Blanc et al. |
| 5,069,523 A | 12/1991 | Finzel et al. |

(Continued)

FOREIGN PATENT DOCUMENTS

DE 3841607 A1 6/1990

(Continued)

OTHER PUBLICATIONS

Corning Cable Systems, Plug & Play(tm) Universal Systems (Oct. 2005)(12 pages).

(Continued)

*Primary Examiner*—Kevin S Wood
*Assistant Examiner*—John M Bedtelyon
(74) *Attorney, Agent, or Firm*—Law Office of Leo Zucker; Michael A. Morra; Edward Charbonneau

(57) ABSTRACT

A network provider cable is routed to a splitter box in a multi-dwelling unit or commercial building where the cable fibers are terminated. One or more riser cables, each terminated at one end at the splitter box, are routed through a building shaft. Each riser cable contains fibers associated with units located on a certain set of one or more floors of the building. The other end of each riser cable is terminated at an aggregation box associated with the floors of the set. A feeder cable is routed between the aggregation box and each floor of the set, or a corresponding floor area of one floor. A drop box is provided for each floor or floor area for terminating the corresponding feeder cable. Drop cables are routed between the drop box and units on the floor or in the floor area to be served.

12 Claims, 7 Drawing Sheets

U.S. PATENT DOCUMENTS

| | | | |
|---|---|---|---|
| 7,206,392 B2 * | 4/2007 | Fingler et al. | 379/93.15 |
| 2006/0008231 A1 | 1/2006 | Reagan et al. | |

FOREIGN PATENT DOCUMENTS

| | | |
|---|---|---|
| EP | 0343057 A1 | 11/1989 |
| EP | 1041417 A2 | 10/2000 |
| FR | 2586822 A1 | 3/1987 |
| FR | 2739460 A1 | 4/1997 |
| JP | 2000 258672 A | 9/2000 |
| JP | 2005 234216 A | 9/2005 |
| JP | 2006 173669 A | 6/2006 |
| WO | 92/00055 A1 | 11/1993 |
| WO | 03/05238 A2 | 9/2003 |
| WO | 2006/014764 A2 | 10/2006 |

OTHER PUBLICATIONS

Corning Cable Systems, FlexNAP(tm) System (Dec. 2006)(6 pages).
Corning Cable Systems, FlexNAP(tm) System (Jan. 2007)(4 pages).
Corning Cable Systems, FlexNap(tm) Terminal Distribution System (Oct. 2005)(4 pages).
T. Smith, et al., "Ribbon vs. Loose Tube Fiber Cabling", Optical Fiber Conf. & Nat'l Fiber Optic Engineers Conf. 2006 (Mar. 5, 2006).
S. Furukawa, et al., "Optical network construction in customer premises", Tech. Reports CSELT, vol. 26, No. 3 (Jun. 1, 1998).
K. Hogari, et al., "Optical Fiber Cables for Residential and Business Premises", Journal of Lightwave Technology, vol. 16, No. 2 (Feb. 1998).

* cited by examiner

FIBER OPTIC CABLING FOR MULTI-DWELLING UNIT (MDU) AND COMMERCIAL BUILDING DEPLOYMENTS

CROSS REFERENCE TO RELATED APPLICATIONS

The present application claims priority under 35 U.S.C. §119(e) of U.S. Provisional Patent Application No. 60/880,169, filed Jan. 13, 2007, and entitled "Multidwelling Unit (MDU) Drop Box for Fiber Optic Cables". Further, this application is a continuation-in-part (CIP) of U.S. Non-Provisional patent application Ser. No. 11/728,785 filed Mar. 27, 2007, now U.S. Pat. No. 7,400,814 and entitled "Wall-Mountable Optical Fiber and Cable Management Apparatus".

BACKGROUND OF THE INVENTION

1. Field of the Invention

The present invention concerns a system and technique for deploying fiber optic cabling for users in multi-dwelling unit (MDU) premises and commercial office buildings.

2. Discussion of the Known Art

The deployment of fiber optic networks at multi-dwelling units (MDUs) and other subscriber premises, requires the use of so-called cable drop boxes which are constructed for mounting on walls or other structures at the premises. Current industry practice calls for the boxes to have a cable entry port at the left side of the box to receive a fiber optic cable originating from the network provider, and one or more ports at the right side of the box through which a number of fibers associated with individual subscribers at the premises are received to be connected with corresponding fibers in the provider cable. See, for example, Corning Cable Systems, Wall-Mountable Connector Housings, at <www.corningcablesystems.com>, and ADC Telecommunications, Indoor Fiber Distribution Terminals—Customer Premises Equipment (CPE), at <www.adc.com/ productsandservices/>. See also, 2007 Multilink Catalog, vol. 24, at pages 87-94, disclosing a family of wall mountable fiber optic cable enclosures available from Multilink, Inc., of Elyria, Ohio, USA.

Installation of the known cable drop boxes by a single worker at a subscriber premises can be difficult and time consuming, however. Further, the known boxes are dimensioned to accommodate older types of fiber optic cables that can not tolerate bend diameters of less than three inches (76.2 mm) without impairing cable performance. Accordingly, the currently available drop boxes are relatively large, and are not suitable for widespread deployment of fiber optic networks at multi-dwelling units or other buildings without significant expenditures of time and labor.

Moreover, in current outdoor fiber-to-the-home (FTTH) deployments, fiber-optic network service is brought to residences through an array of optical fiber distribution and drop cables. For example, the head end of a distribution cable is terminated at a splitter/splice cabinet the field, where the distribution cable connects with a trunk cable originating from a central office. The distribution cable is then run aerially or below grade through the residential neighborhood to be served by the network. Drop cables that service individual residences are connected with the distribution cable through terminations at splice closures or connections at network terminals such as, e.g., a so-called FlexNAP terminal available from Corning. When a fiber in the distribution cable is accessed mid-span, it is coupled to either a "tether" leading to a network terminal, or directly to a drop cable. The portion of that individual fiber that remains in the distribution cable is then left unused and becomes "dead", however. Accordingly, when multiple midspan access points are required for drops, half of the fiber in the distribution cable may be left unused or is wasted.

Another problem arises when bringing a fiber optic network distribution system to a multi-dwelling residence or office building. For example, the Corning FlexNAP system requires factory installation of the mentioned "tethers" from the distribution cable, at various points along the length of the cable. In an outdoor aerial network, access to the tethers is fairly simple, since the tethers may be accessed at any point using a "cherry picker" or similar lift apparatus. In a residential or commercial office building, however, the distribution cable is typically in the form of a riser cable that is routed inside a vertical shaft or conduit between floors of the building. The size of the riser shafts and the means available for accessing them typically vary from building to building. Thus, it may be difficult if not impossible to access the tethers on a fiber optic distribution cable once the cable is placed in the riser shaft of an existing building.

SUMMARY OF THE INVENTION

According to the invention, a system for deploying fiber optic cabling for serving units on floors of a multi-dwelling unit or commercial building, includes at least one splitter box arranged for terminating optical fibers of an outside cable routed to the splitter box in the building for terminating fibers carried in the cable. One or more riser cables, each terminated at one end at the splitter box, are routed through a building shaft. A given riser cable contains fibers associated with units on a certain set of one or more floors of the building. The other end of each riser cable is terminated at an aggregation box associated with each floor of the set of floors. A feeder cable is routed between the aggregation box and each floor of the set, or a corresponding floor area of one floor. A drop box is provided for each floor or floor area for terminating the corresponding feeder cable. Drop cables are routed between the drop box and units on the floor or in the floor area to be served.

According to another aspect of the invention, a method of deploying fiber optic cabling for serving units on floors of a multi-dwelling unit or commercial building, includes routing a provider cable to a splitter box in the building and terminating fibers carried in the cable at the splitter box. One or more riser cables are terminated at one end at the splitter box and are routed through a building shaft, wherein a given riser cable contains fibers associated with units on a certain set of floors or with units in different areas of a single floor. The method also includes terminating the other end of each riser cable at an aggregation box provided for a corresponding set of floors or floor areas, routing a feeder cable between the aggregation box and each floor of the set or floor area, providing a drop box for each floor or floor area, and terminating a corresponding feeder cable at the drop box. Drop cables are routed between the drop box and units on the floor or in the floor area to be served.

For a better understanding of the invention, reference is made to the following description taken in conjunction with the accompanying drawing and the appended claims.

DETAILED DESCRIPTION OF THE INVENTION

Figure 1:
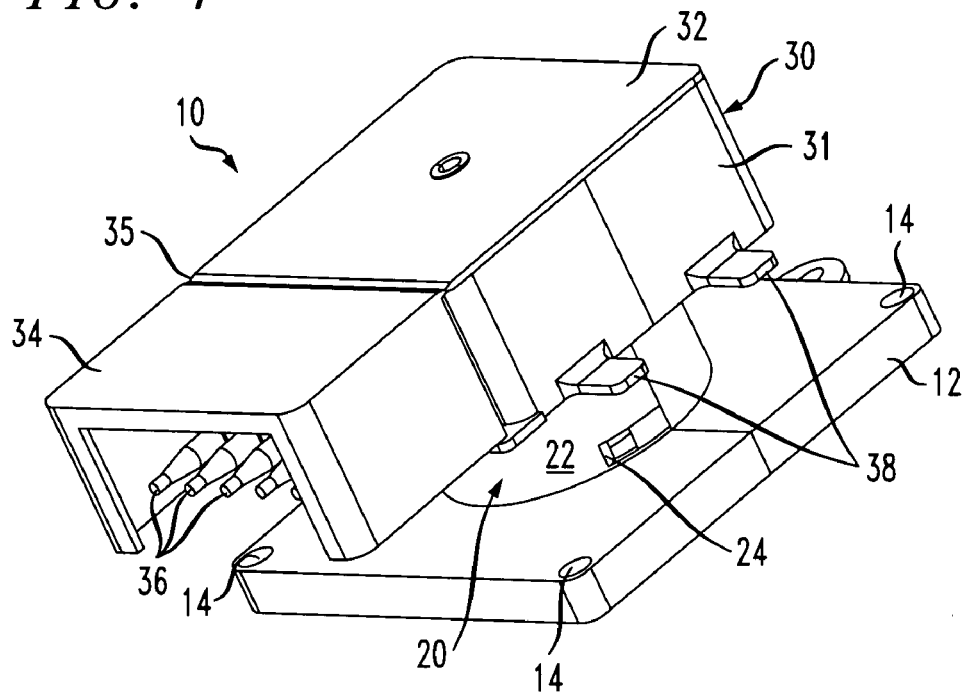
FIG. 1 is a perspective view of a first embodiment of optical fiber and cable management apparatus in the form of a wall mountable cable drop box, according to the invention.

FIG. 1 shows a first embodiment of optical fiber and cable management apparatus in the form of a cable drop box 10, according to the invention. The box 10 may be constructed of sheet metal, and/or plastics materials such as, without limitation, ABS or polycarbonate. Moisture proof seals, gaskets and the like may also be provided on or within the box 10 in a known manner if the box will be mounted outdoors at a subscriber premises. The box 10 has a base 12 which, in the disclosed embodiment, is generally square and measures, e.g., about 6.25 inches (158.75 mm) long on each side with mounting holes 14 formed at each corner of the base.

The box 10 also has a drum region 20 that extends axially upward from a central portion of the base 12. The drum region 20 includes an outer cylindrical wall 22 the outside periphery of which is partially visible in FIG. 1. The outside diameter of the wall 22 is sufficient to allow a length of a fiber optic cable (not shown) to be wound on the drum wall 22 for storage or retention, with at least the minimum bend diameter specified for the cable. For example, when using cables of Allwave® Flex™ fiber available from OFS Fitel, the outside diameter of the drum wall 22 can be about 3.0 inches (76.2 mm) or less. An inside end portion of the cable enters a cable entry port in the drum wall while being supported over a substantially straight path by a strain relief device 24 fitted within the entry port. The device 24 is described further below in connection with FIGS. 7 to 9B, and it guides the end portion of the cable through the cylindrical wall 22 along a line tangential to the circumference of the wall at the location of the device 24.

The cable drop box 10 also has an interface compartment 30 that is disposed atop the drum region 20, and which has a peripheral side wall 31. In the embodiment of FIG. 1, the compartment 30 has a removable cover lid 32 constructed and arranged to permit an installer to access the interior of the compartment 30 from outside, and a connector guard or cover 34 that is hinged to the lid at 35. As explained below, the interface compartment 30 is dimensioned and formed to allow a first set of optical fibers that enter the compartment 30 and originate either from a cable wound over the drum region 20, or from a cable that enters a port in the compartment wall 31 (see FIGS. 2 and 3), to connect with a second set of optical fibers from another cable which fibers terminate in connectors 36 seen beneath the cover 34 in FIG. 1. A number of flat fingers or tabs 38 are formed to project outward from lower side edges of the compartment wall 31, and are parallel to the base 12. The tabs 38 and the base 12 together serve to confine a length of cable wound about the drum wall 22, in the region between the base and the interface compartment 30.

Figure 2:
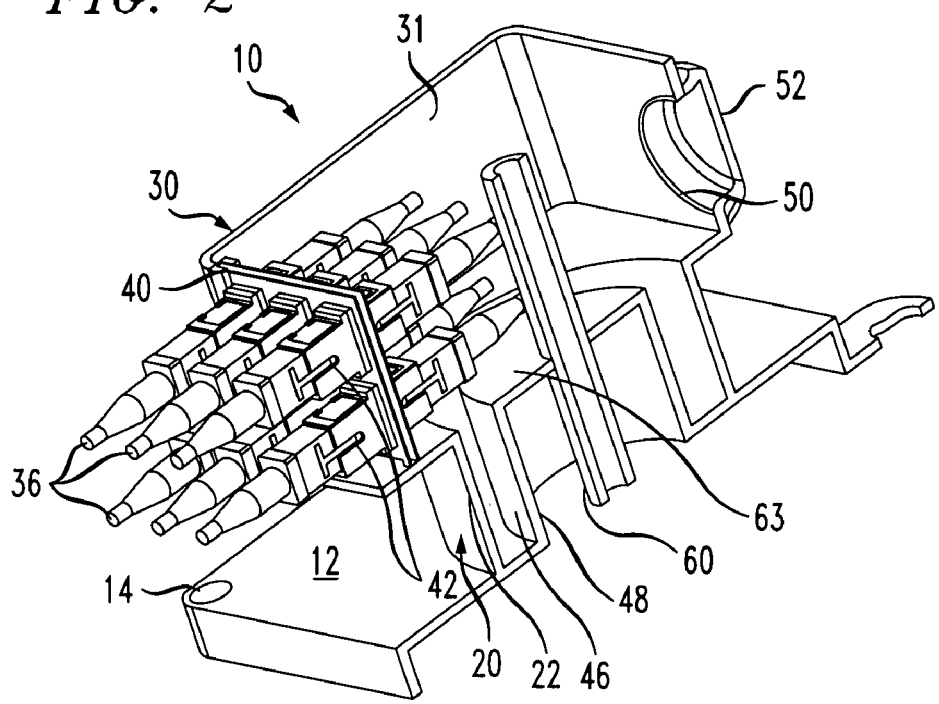
FIG. 2 is a cross-sectional elevation view of the drop box of FIG. 1, showing a cable drum region and other internal components of the box.
Figure 3:
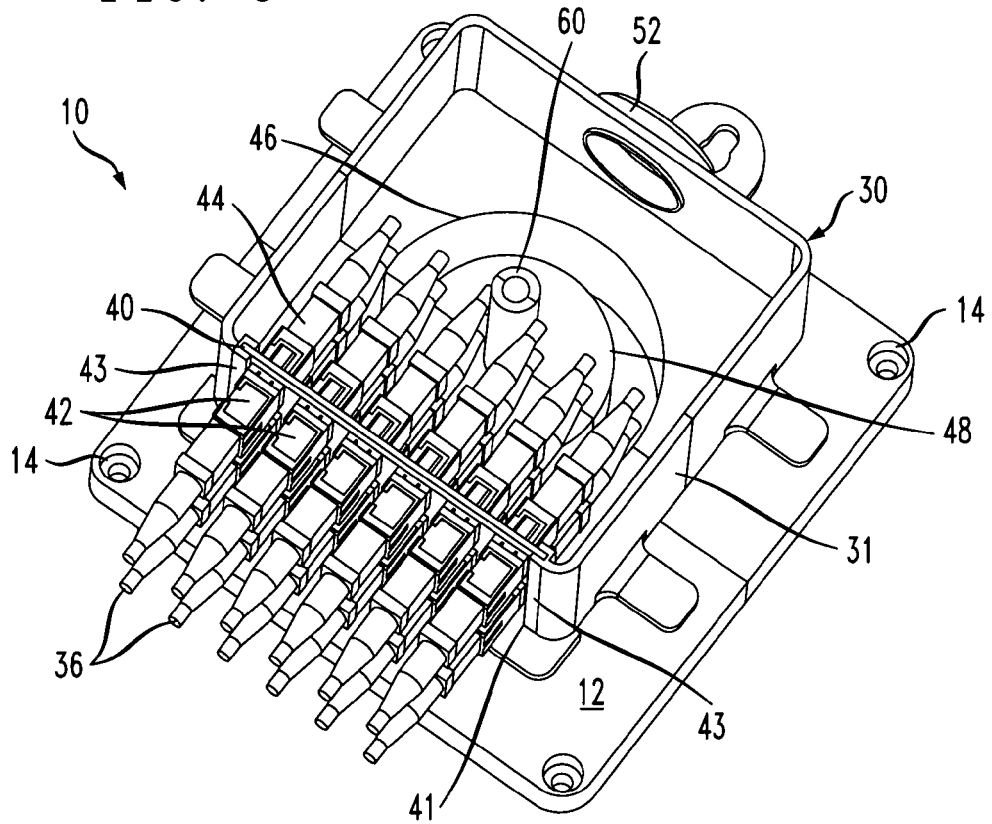
FIG. 3 is a view of the drop box of FIG. 1 as seen from the top with a cover lid removed.

FIG. 2 is a cross sectional view in elevation of the drop box 10 in FIG. 1, and FIG. 3 is a view of the box 10 as seen from the top with the cover lid 32 removed. The interface compartment 30 features a connector panel 40 that is supported to occupy a cut out region 41 in the compartment sidewall 31. A number of optical connector adapters 42 are mounted to extend through corresponding openings in the panel 40, and the adapters 42 operate to couple the fiber optic connectors 36 at the external side of the panel 40, with corresponding connectors 44 at the internal side of the panel. Preferably, the panel 40 is mounted in the sidewall 31 so that it can be easily removed and exchanged with another panel of the same dimensions but in which adapters of a different type are mounted. For example, the panel 40 may be slid in or out of vertical channels 43 formed at both ends of the sidewall cut out region 41. A desired panel 40 may then be selected from among a number of different panels having adapters 42 which accommodate, for example, type LC, SC, FC, ST, MPO, or type MPX connectors, depending on the type of cable connectors used at a given deployment.

As mentioned, optical fibers routed into the interface compartment 30 may originate from the inside end portion of a cable wound over the drum region 20 and which passes through the drum wall 22 via the strain relief device 24. In such an application, the fibers are routed through an annular fiber routing region 46 that extends between the outer cylindrical wall 22, and an inner cylindrical wall 48 of the drum region which wall 48 is formed radially inward of the outer wall 22. The strain relief device 24 and the dimensions of the annular fiber routing region 46, are such that individual optical fibers will not be subject to a bend diameter less than that specified for the fibers before entering the interface compartment 30 and terminating in the connectors 44. For example, when using cables of Allwave® Flex™ fiber available from OFS Fitel, the inner wall 48 may have an outside diameter as small as 0.7874 inches (20 mm), and the mean diameter of the fiber routing region 46 may only be about 2.0 inches (50.8 mm).

The sidewall 31 of the interface compartment 30 also has a cable entry or pass through port 50 (FIGS. 2 & 3) in a rear section of the wall 31 for receiving an outside fiber optic cable or cable assembly (not shown) whose fibers are to be coupled with those fibers terminated by the connectors 36. Alternatively, the cable entry port 50 may be provided in the form of a large opening through a portion of an alternate connector panel 40 (not shown). In such applications, the fibers of the cable entering the rear port 50 may be routed directly to corresponding ones of the connectors 44 with little, if any, bending whatsoever. Moreover, the use of multifiber connectors such as type MPO in the connector panel 40 enables the box 10 to act as an aggregation box. That is, multiple cables originating from other like boxes at different levels of a multi-dwelling unit (MDU) may enter the rear port 50 of the interface compartment 30, to connect via the MPO connectors with a single cable routed to the box from an alternate location, e.g., the basement of the MDU. See FIG. 13 and related text below. If not used, the rear cable entry port 50 is preferably kept closed by a plug 52.

Figure 4:
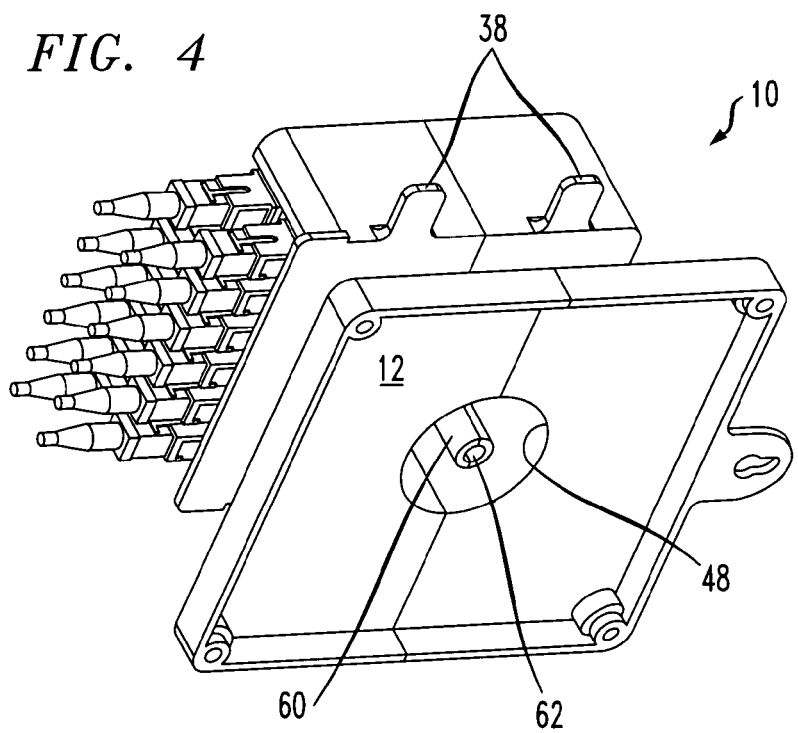
FIG. 4 is a view of the drop box of FIG. 1 as seen from below.

FIG. 4 is a bottom view of the fiber optic cable drop box of FIG. 1. A cylindrical tube 60 is formed with a central axial passage 62. The tube 60 extends axially between a top end of the tube 60 that fits through a clearance opening in the cover lid 32 to lie flush with the lid's top surface as shown in FIG. 1, and a bottom end of the tube where the tube passage 62 opens beneath the base 12 as seen in FIG. 4. The axis of the tube passage 62 coincides with the axis of the outer cylindrical wall 22 of the drum region 20. In the disclosed embodiment, the tube 60 extends above and below the center of a wall 63 that closes an upper axial end of the inner cylindrical wall 48, as seen in FIG. 2.

The diameter of the central passage 62 in the tube 60 is preferably sufficient to allow a long narrow tool such as a screwdriver shaft, bolt or other payoff mandrel, to be inserted through the passage from above or below the box 10 so that the tool will act as a spindle about which the box 10 can turn freely. This construction allows a single worker easily to pay out a cable wound on the drum region 20, as may be necessary for a network deployment at a MDU. For example, while holding the handle of an inserted screwdriver in one hand, the worker can use his or her other hand to pull and unwind a desired length of the cable from the drum region 20 while the box 10 is free to turn about the screwdriver shaft.

Figure 5:
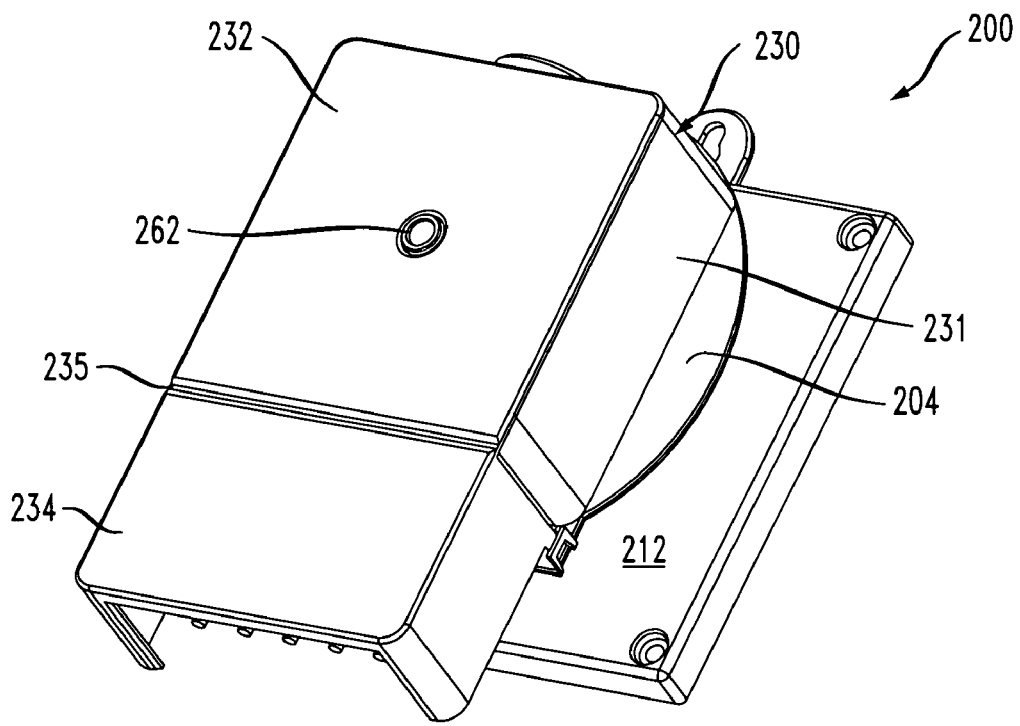
FIG. 5 is a perspective view of a second embodiment of a wall mountable cable drop box, according to the invention.
Figure 6:
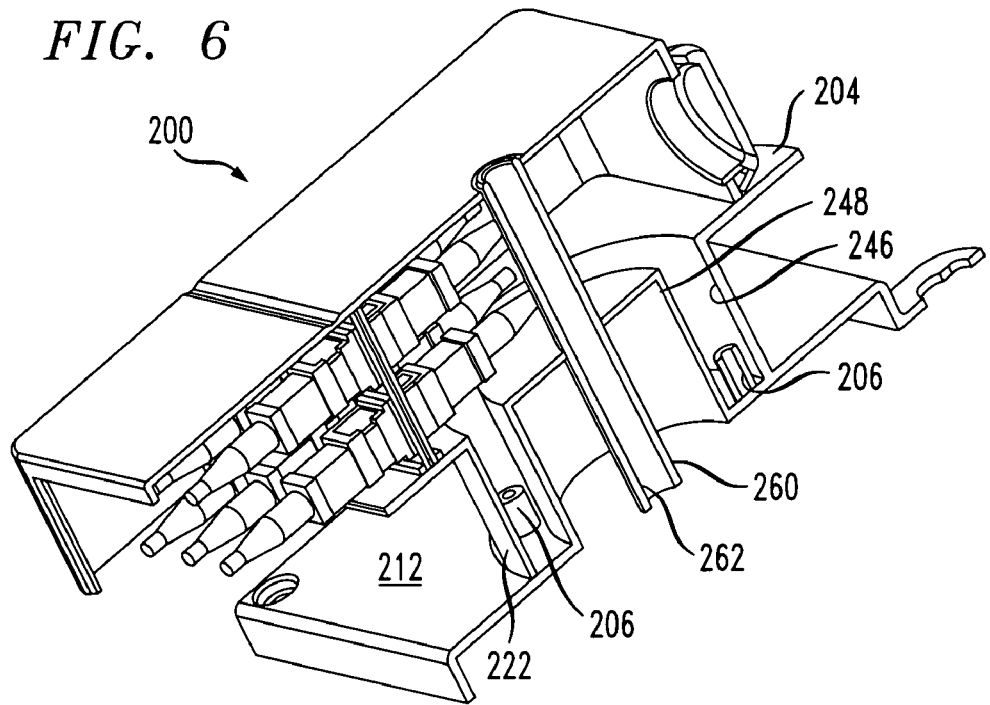
FIG. 6 is a cross-sectional elevation view of the drop box of FIG. 5.
Figure 7:
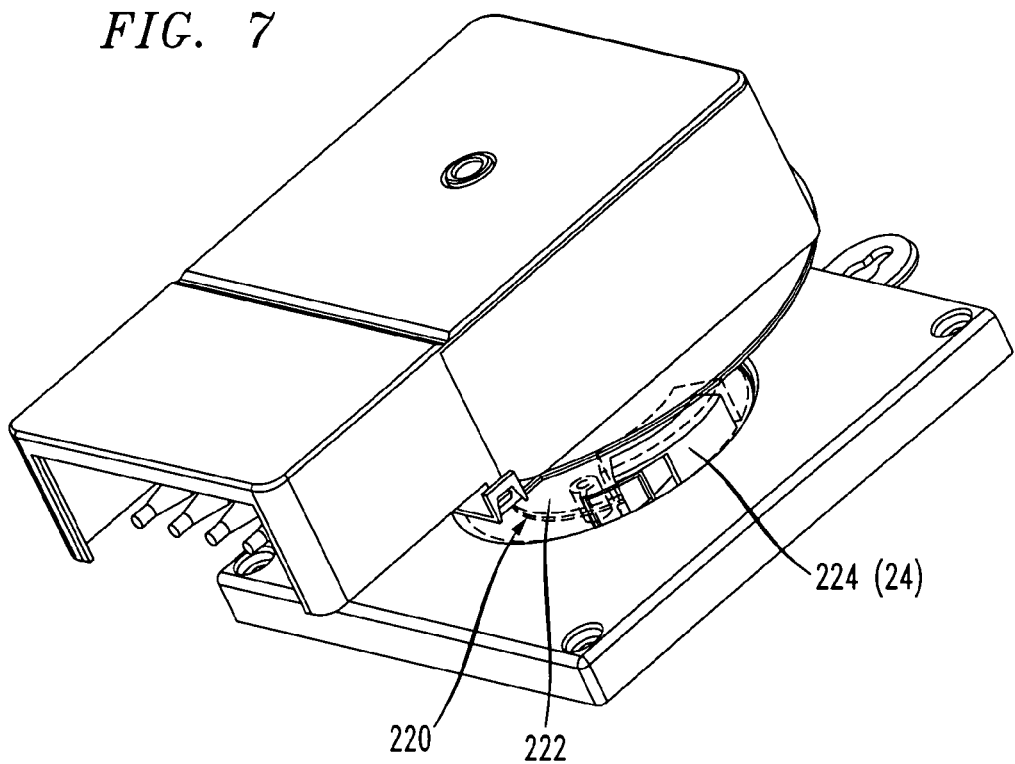
FIG. 7 is a side view of the drop box of FIG. 5, showing the location of a cable strain relief device according to the invention.

FIGS. 5 to 7 show a second embodiment of a fiber-optic cable drop box 200 according to the invention. Components of the box 200 that are identical or similar to those of the box 10 of FIGS. 1 to 4, have corresponding reference numerals increased by 200.

The box 200 has a single piece cover lid 232 with an integrated hinge 235 for a connector guard or cover 234. Further, a side wall 231 of an interface compartment 230 has a continuous circular disk flange 204 that extends radially outward beneath the compartment 230, parallel to a base 212 of the box. The flange 204 and the base 212 together serve to confine a length of fiber optic cable wound on the outer cylindrical wall 222, within the region between the flange 204 and the base 212. As with the box 10 of FIGS. 1 to 4, an inside end portion of the cable is guided by a strain relief device 224 to enter an annular fiber routing region 246 inside the box 200, over a substantially straight path tangential to the circumference of the wall 222 at the location of the device 224.

Also, as seen in FIG. 6, the base 212 of the drop box 200 may be formed as a separate piece that is fastened to the bottom of the drum region 220 by, e.g., screws or other fasteners that are formed to engage collars 206 fixed at the bottom of the annular fiber routing region 246.

Figure 8:
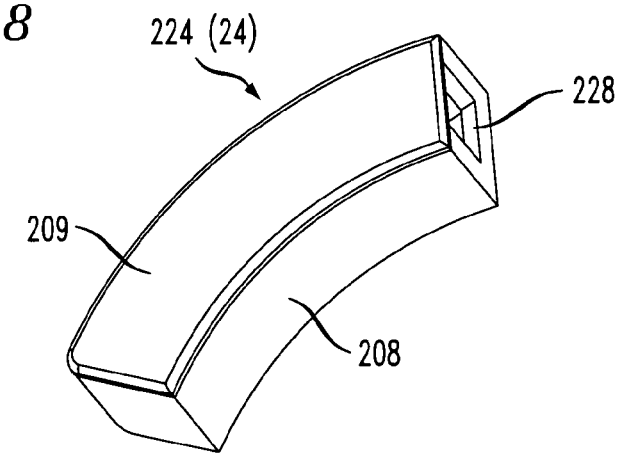
FIG. 8 is an enlarged perspective view of the cable strain relief device.
Figure 9:
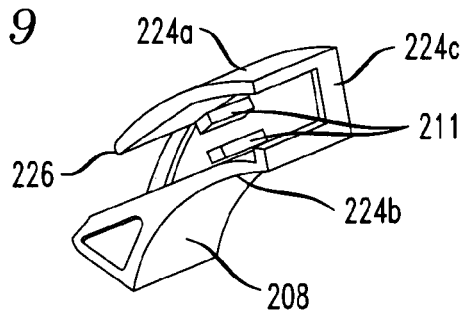
FIG. 9 is a view of the strain relief device in FIG. 8 with a top cover removed.

FIG. 8 is an enlarged, perspective view of the strain relief device 224 which corresponds to the strain relief device 24 provided in the drop box 10 in FIG. 1. As seen in FIG. 9, the strain relief device 224 is comprised of an arcuately shaped device body 208 with a generally U-shaped cross section having an outer side wall 224a, an inner side wall 224b, a base wall 224c, and a cover 209 that fits atop and extends between the side walls 224a, 224b of the device.

Figure 9A:
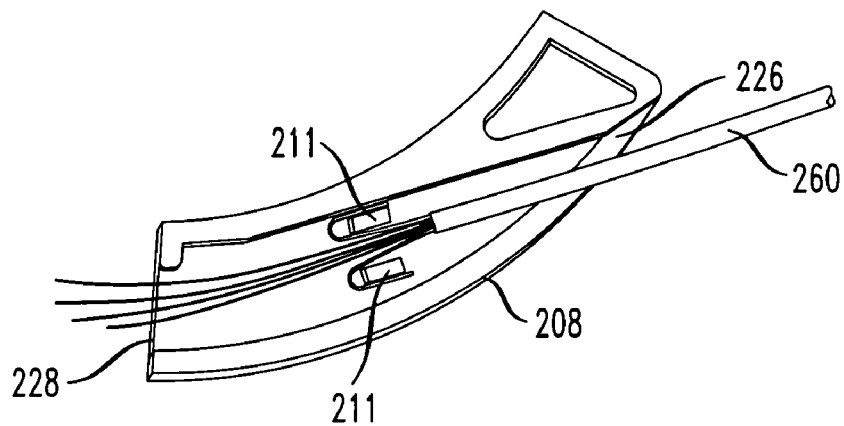
FIG. 9A is also a view of the strain relief device without the top cover, and shows a fiber optic cable entering one end of the device and individual fibers of the cable exiting from an opposite end of the device.

Further, as shown in FIG. 9A, the outer side wall 224a has an opening 226 at one end of the device 224 for receiving the inner end portion of, e.g., a flat ribbon fiber optic cable 260 wound on the outer cylindrical wall 222 of the drum region 220. An opening 228 at the opposite end of the device 224 allows individual fibers of the cable to exit from the device and to enter the fiber routing region 246 of the box 200, preferably after each fiber is protected with, for example, a commercially available 900 µm sleeve.

Figure 9B:
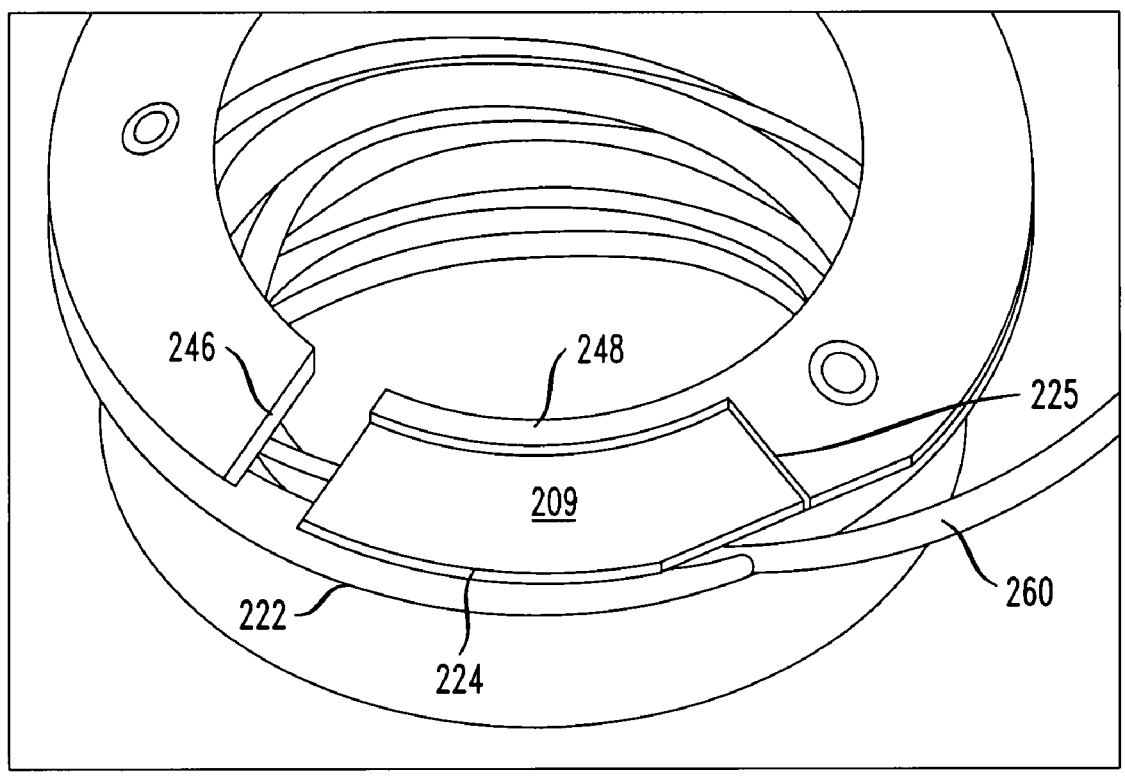
FIG. 9B shows the strain relief device in place in the drum region of the drop box.

The cable 260 and its individual fibers are guided over a substantially straight path between the device openings 226, 228, with the aid of a pair of parallel fingers or guides 211 that project upward from the base wall 224c of the device 224 as seen in FIGS. 9 and 9A. After outer jacketing is stripped away from the end portion of the cable 260, lengths of an aramid or Kevlar® yarn that surrounds the cable fibers and serves as a reinforcing or strength material for the cable, are wrapped about and secured to the guides 211 with an epoxy or other suitable adhesive. Commercially available protective sleeves (e.g., 900 µm) are placed over each of the individual cable fibers, and the sleeved fibers are guided out of the device opening 228. The device cover 209 is fixed to the body 208 via a suitable adhesive, and the assembled cable strain relief device 224 is fixed securely within a cable entry port 225 defined between the outer cylindrical wall 222 and the inner cylindrical wall 248 of the drum region 220, as shown in FIG. 9B.

Accordingly, the inside end portion of the cable 260 and its individual fibers pass tangentially with respect to the outer cylindrical wall 222 through the cable entry port 225 in the wall, and into the annular fiber routing region 246 of the box 200. Because the yarn surrounding the fibers is anchored to the guides 211 of the strain relief device 224, any force applied externally to the cable 260 when the cable is being wound on or off the outer cylindrical wall 222 of the drum region, is transferred to the wall 222 in which the device 224 is fixed rather than to the fibers themselves.

Figure 10:
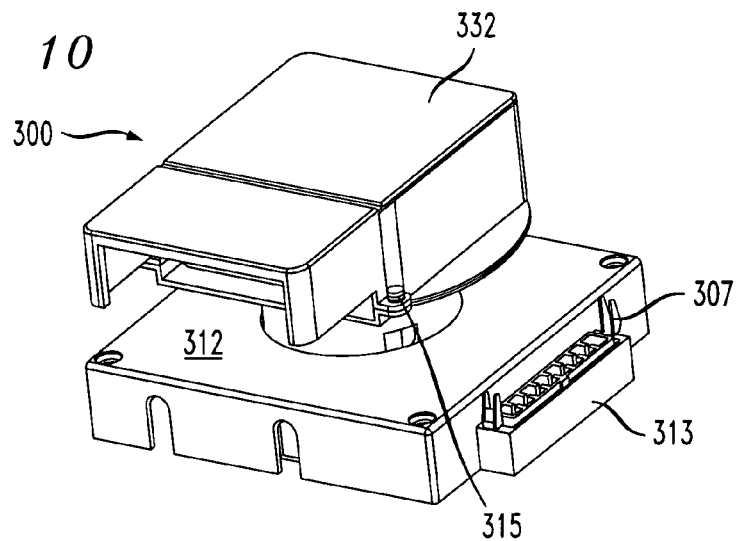
FIG. 10 is a perspective view of a third embodiment of a wall mountable cable drop box, according to the invention.
Figure 11:
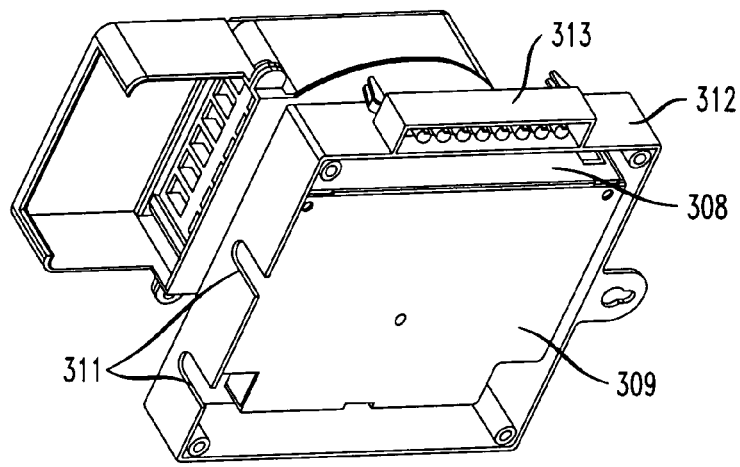
FIG. 11 is a view of the drop box of FIG. 10 as seen from below.
Figure 12:
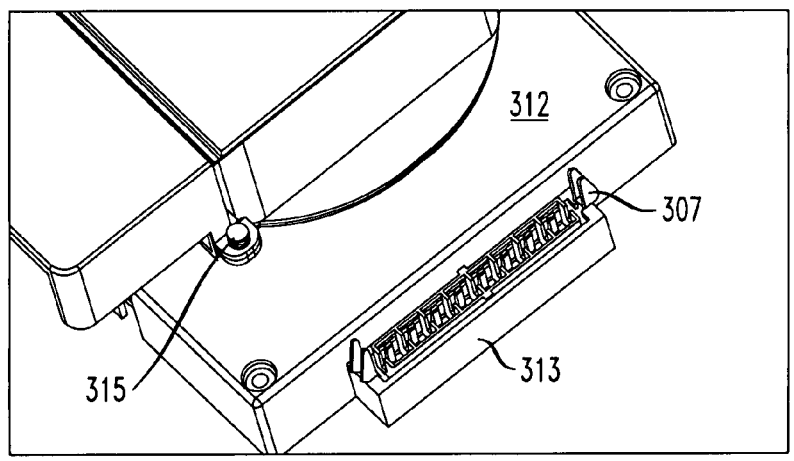
FIG. 12 is a perspective view of a connector parking area on a base of the drop box of FIG. 10.

FIGS. 10 to 12 show a third embodiment of a fiber optic cable drop box 300 according to the invention. Components of the box 300 that are identical or similar to those of the box 10 of FIGS. 1 to 4, have corresponding reference numerals increased by 300. The box 300 features an integral splice compartment 308 in its base 312, a connector parking area 313, and a number of security latch holes 315.

Splice Compartment 308

Typical MDU drop box installations have single fiber breakouts that egress from the box, wherein each breakout is associated with a corresponding living unit of the premises where the box is installed. Single fiber cables from each living unit are often routed to a drop box without a terminating connector. The bare ends of these cables can be terminated at the drop box in various ways. For example, single ended fiber pigtails can be spliced within the drop box so that splice sleeves are housed in a common space. This requires a chamber or compartment to house the splice in order to prevent damage and to manage fiber slack. Alternatives may include mechanical splicing of the pigtails, which would require a similar chamber or housing. The individual single fiber cables may also be terminated directly with a field installable connector, thus obviating the need for a splice chamber.

The drop box 300 has an integrated splice chamber or compartment 308 attached or formed underneath the base 312, including a splice tray 309 mounted inside the base. The splice tray 309 may be fixed within the box 300, or affixed directly to a wall. In either case, the box 300 may be installed over the splice compartment 308. Pigtails or terminated ends can then enter or exit a lower section of the compartment through corresponding clearance notches 311 that are cut in a side wall of the base 312.

Connector Parking Area 313

The connector parking area or block 313 allows terminated fiber ends to be stored while not in use. The block 313 is constructed and dimensioned to receive and secure a selected one of a number of different commercially available connector parking strips 307 (e.g., type SC) in the block 313. This feature enables the future use of alternate connector types without having to replace the box 300, but at the same time allows installers to forego parking

Latch Holes 315

Several latch or security holes 315 may be formed through corresponding feet on the hinged cover lid 332. The latch holes 315 allow the end user to utilize a number of safety lockout methods. For example, one hole 315 can be used with a standard plunger type latching mechanism simply to keep the lid closed. Other holes 315 can be used to receive wire ties, lockout tags, or other security locks.

Fiber Optic Cabling for MDU or Commercial Building Deployments

Figure 13:
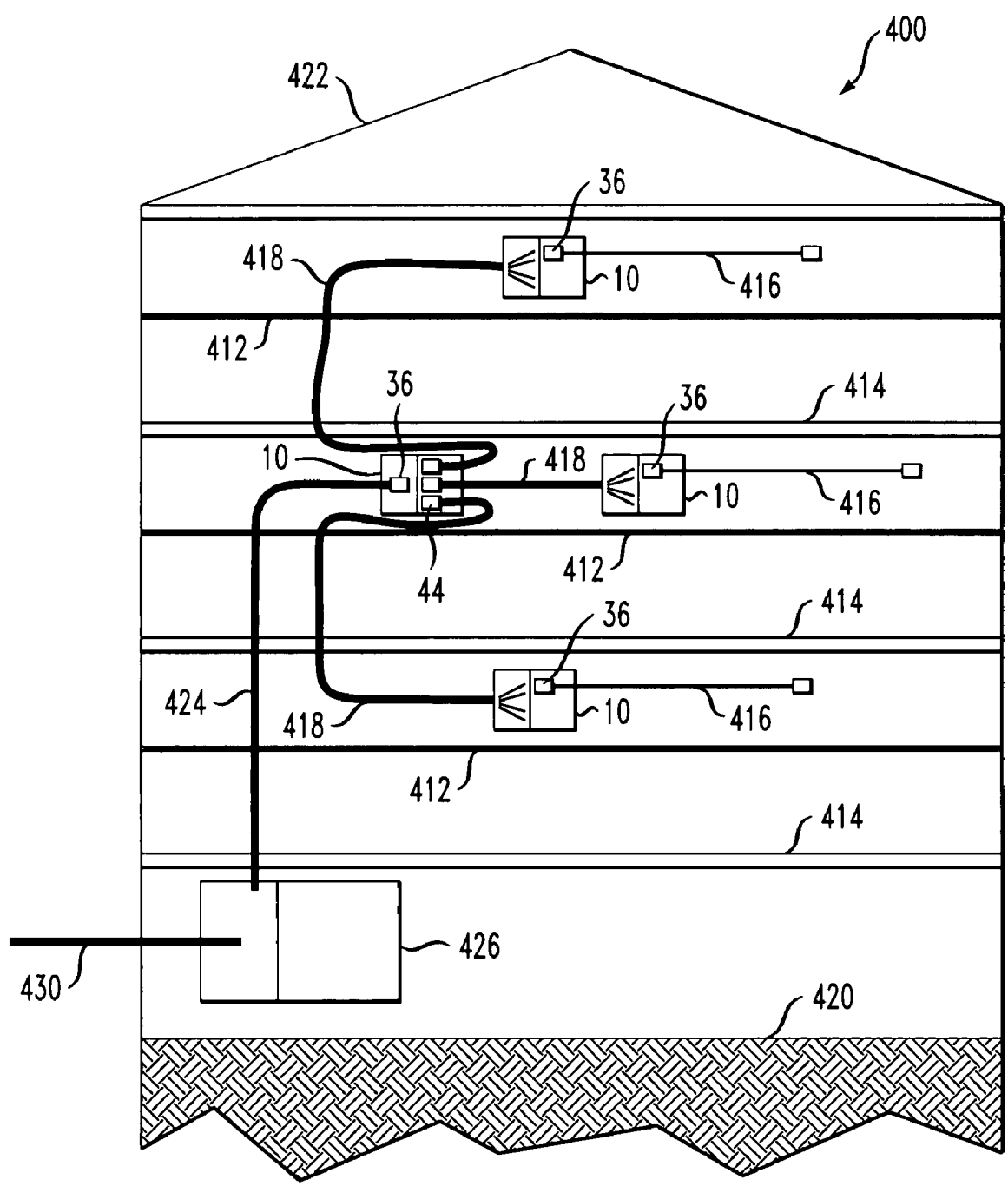
FIG. 13 is a schematic diagram showing a fiber optic cabling deployment or distribution system according to the invention.

FIG. 13 illustrates a fiber optic cabling distribution system deployed at a multi-dwelling unit or commercial building 400 according to the invention. A number of drop boxes, for example, the inventive box 10 of FIGS. 1 to 4, are mounted at corresponding locations in the building 400. The drop boxes 10 may be located, for example, above a drop ceiling 412 of each floor 414 of the building. Optical fibers 416 corresponding to individual building units (e.g., apartments or offices) on a given floor 414, or to units located within a defined area of the floor 414, are terminated in the connectors 36 which in turn are connected to the adapters 42 on the external side of the box panel 40.

Each of the fibers 416 is connected with a corresponding fiber in a feeder cable 418 that is routed, e.g., above the ceiling of the associated floor 414 to the drop box 10. The cable 418 may initially be wound about the drum region 20 of the drop box 10, and partially or fully unwound later for routing to another box 10 that serves as an "aggregation" box located, e.g, between a basement 420 and a roof 422 of the building 400. The fibers of the feeder cable 418 are terminated in the connectors 44 which, in turn, are connected to the adapters 42 on the internal side of the box connector panel 40.

At the aggregation box 10, each one of the feeder cables 418 containing fibers associated with users on a corresponding building floor or floor area, enters the aggregation box through its rear pass through port 50 or a faceplate port. As mentioned earlier, the fibers of each feeder cable 418 may be routed inside the aggregation box with little if any bending to connect via a multi-fiber array (MPO) connector 44 with a corresponding adapter 42 on the internal side of the box panel 40. One or more main (or "riser") fiber optic cables 424 for serving all network users in the building 400, is routed through a riser shaft or conduit in the building between a cable entry or splitter box 426 in the basement 420, and a corresponding aggregation box 10 in which the riser cable fibers connect to the adapters 42 on the external side of the box panel 40 via multifiber connectors 36. An outside network provider cable 430 is routed to and terminated at the entry box 426, and fibers carried in the cable 430 are connected to corresponding fibers of each riser cable 424 in the entry box 426.

The various cabling box constructions disclosed herein incorporate the following significant features:

1. Reduced physical dimensions for accommodating newer types of fiber optic cable such as Allwave® Flex™ available from OFS Fitel and which have superior bending performance.

2. An axial drum region that provides for external cable storage and keeps internal fiber routing within safe bending limits.

3. A central through tube that facilitates pay-off of cable wound externally on the drum region, with the use of a common tool such as a screwdriver.

In the fiber-optic cabling distribution system of FIG. 13, a number of drop boxes each associated with units on a corresponding floor, or units in a certain area of one floor, are connected via the feeder cables 418 with a common aggregation box which, in turn, is connected via a riser cable 424 with the splitter box 426 in the basement 420 of the building 400. The system preferably uses multifiber array connectors such as MPO type on each riser cable 424 and on each of the feeder cables 418 in order to reduce size and to speed system installation and deployment. Alternatively, the use of single-fiber connectors and/or fusion splicing on the riser cable 424 and the feeder cables 418, may be practiced if desired.

Each riser cable 424 is preferably in the form of an optical fiber ribbon cable in order to provide maximum fiber packing density and to minimize the overall size of the cable. Also, as mentioned, the riser and the feeder cables 424, 418 are preferably terminated with multifiber array connectors which enable multiple fibers to be connected in a single step. Multifiber array type MPO connectors, as well as singlemode and multimode riser grade ribbon cabling, are available commercially from OFS Fitel.

The system of FIG. 13 allows rapid installation of cables in high rise (e.g., seven or more floors) buildings without wasting fiber as occurs with the known preassembled FTTx systems that employ loose tube distribution and drop cables, and OptiTap connectors. The system may also be used in high/mid-rise buildings for commercial data networks, for "fiber to the floor", "fiber to the premises", or "fiber to the desk" applications.

Embodiment for High-Rise Buildings

The inventive system may be deployed in high-rise buildings by providing:

1. One or more of the splitter boxes 426, for terminating the outside plant or provider cable 430 serving the building 400, and splitting the signals so that each individual fiber 416 associated with a unit in the building can be coupled optically with a corresponding fiber in the provider cable 430. As mentioned, the splitter box 426 is preferably located in the basement 420 or a lower level of the building 400.

2. One or more fiber optic riser cables 424, preferably ribbon type and terminated with multifiber array (MPO) connectors. An advantage of using the MPO connectors is that all the fibers of a single ribbon can be terminated at one time when inserted into a common ferrule block of the connector. Each riser cable 424 has a sufficient number of fibers to serve units on one or more floors, or units located in a defined area of a single floor. The provider ends of the riser cables are terminated at the splitter box(es) 426, and the cables are routed through a riser shaft or conduit in the building 400 to connect with a corresponding aggregation box. In cases where multiple riser cables 424 are terminated in their own connectors, each of the cables preferably has a different length so that the cables can be bundled and pulled together through relatively small shaft openings without interference by connectors mounted on the unit (subscriber) ends of the cables.

3. Aggregation boxes deployed every Nth floor, where N may be as great as, e.g., six. The aggregation boxes may be deployed in utility equipment closets or other spaces dedicated to telecommunications equipment. For example, in buildings having 12 units per floor, an aggregation box may be deployed every sixth floor at which box a 72-fiber ribbon riser cable with six 12 fiber ribbons is terminated. Each aggregation box includes the adapters 42 for connecting its associated riser cable 424 with the feeder cables 418 routed between the aggregation box and each floor, or floor area, served by the box.

If a large number of units on one floor require network service (e.g., 60 fibers to be terminated all on the same floor), the floor may be partitioned into defined areas and an aggregation box installed for servicing only the one floor. For example, if service is being provided to a building with a large footprint (e.g., a whole city block), one aggregation box may be installed on a given floor, and all of the associated feeder cables and drop boxes would be located at the level of the given floor for servicing units in corresponding areas of the floor.

4. Each aggregation box has its associated feeder cables 418 that are routed from the box to serve units on one or more floors, or units in defined areas of a single floor, in the building 400. The feeder cables 418 may be run out of a telecom equipment closet located on a floor whose units are served by the cable. To serve units located on floors located above and below the closet, the feeder cables 418 may be routed from the closet and back into the riser shaft, and exit from the shaft, at the corresponding floors. For example, in a building having six floors each with 12 units, a series of 12-fiber feeder cables 418 would be connected to the aggregation box. If the aggregation box is on floor "N", then six 12-fiber feeder cables are routed to floors N−3, N−2, N−1, N, N+1, and N+2. The feeder cables are preferably terminated with small form-factor multifiber array (e.g., MPO) connectors so as to allow the size of the aggregation box to be minimized. That is, an aggregation box with six 12 fiber MPO-MPO adapters 42 can be much smaller in size than a box configured to adapt six 12 fiber MPO connectors with 72 individual type LC connectors. Also, if MPO terminations are used, then each feeder cable 418 may advantageously be in the form of a single ribbon for ease of termination. It is, however, also possible to terminate 12 loose fibers, or twelve 900-micron buffered fibers, with a single MPO connector.

In the high-rise embodiment, each floor has one or more associated drop boxes 10 for terminating corresponding feeder cables 418, wherein the fibers of a given feeder cable are coupled to the smaller individual cables and/or fibers 416 that are routed to the units on the floor, or to units the in a defined area of the floor. An example of a suitable drop box is the box 10 disclosed herein; however, it is possible for the feeder cables 418 to be routed directly to the units in the building 400 and for individual fibers of a given cable to be broken out at the sites of the units associated with the individual fibers.

Embodiment for Mid-Rise Buildings

The inventive system may be deployed in mid-rise buildings by providing:

1. One or more of the splitter boxes 426, for terminating the outside plant or provider cable 430 that serves the building 400, and for splitting the signals so that each individual fiber 416 associated with a unit in the building can be coupled optically with a corresponding fiber in the provider cable 430. As mentioned, the splitter box 426 is preferably located in the basement 420 or a lower level of the building 400.

2. Feeder cables 418, preferably terminated at each end with multifiber array (e.g., type MPO) connectors. The cables 418 may be routed directly between the splitter box 426 in the basement 420, and each floor of the building 400 (or a telecom equipment closet on each floor). At each floor or telecom node, the corresponding feeder cable 418 is routed to an associated drop box 10 for termination, and corresponding fibers of the cable 418 are coupled in the drop box to the smaller cables and/or fibers 416 associated with individual units on the floor.

Advantages of the inventive distribution system include, inter alia;

1. Fast deployment. The riser and the feeder cables 424, 418 are preferably provided with multifiber array (e.g., MPO) connectors that are pre-fitted or factory installed on the cables in advance. In current deployments, fusion splicing is often used for termination, which is expensive and time-consuming. The use of MPO connectors minimizes the footprint and installation time in the field.

2. Ease of installation in riser shafts. The system may be deployed in older residential buildings whose riser shafts typically are not in the best condition for deployment of modern telecommunications infrastructure. The use of compact (e.g., ribbon type) riser cables 424 minimizes the size and number of riser cables needed for deployment, and the use of the aggregation boxes serves to reduce the number of different locations where the riser cables must exit the riser shaft.

3. No wasted fiber. Existing cable distribution systems such as the mentioned FlexNAP system are pre-terminated and designed for fast deployment in the outside plant. For deployment in residential neighborhoods, a loose-tube outside plant distribution cable is usually routed adjacent to a street on poles or inside a conduit. At certain intervals, some of the fibers are broken out from the distribution cable and terminated in a Network Access Point (NAP) terminal box, i.e., a device that connects fibers in the distribution cable to fibers of individual drop cables. Each fiber that is broken out at the access point is cut and terminated in the NAP box, so that a downstream portion of the fiber that remains inside the cable is left unused, i.e., becomes "dead" fiber that carries no signal. Thus, no matter how many breakouts are made or where, as much as half of the fiber in the distribution cable may become wasted after installation. By contrast, in the inventive system, all the fibers in the riser cables 424, which carry signals between the splitter box 426 and the aggregation boxes, remain active. And if the drop boxes 10 are used on each floor, all the fibers in each of the feeder cables 418, which carry signals between the aggregation boxes and the drop boxes 10, remain active as well.

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A system for deploying fiber optic cabling for serving units in a multi-dwelling or commercial building having a cable entry location, a riser shaft or conduit, and one or more floors on which the units are located; comprising:

a splitter box in the vicinity of the cable entry location and arranged for terminating optical fibers of an outside cable routed to the splitter box from the entry location, wherein each one of the fibers of the outside cable corresponds to a unit in the building to be served;

at least one riser cable routed through the riser shaft or conduit, wherein each riser cable has first optical fibers for serving units located on a different set of one or more floors of the building, and first ends of the first optical fibers are terminated at the splitter box for coupling with the optical fibers of the outside cable that correspond to the units served by the first optical fibers of the riser cable;

an aggregation box installed in the vicinity of each different set of one or more floors for serving units located on a floor of the set, wherein the aggregation box is constructed and arranged to terminate second ends of the first optical fibers of a corresponding riser cable;

a number of feeder cables each of which is routed from the aggregation box to a different floor of said set floors or to a different area of a single floor, wherein each feeder cable has a number of second optical fibers for serving units on a corresponding floor or in a corresponding floor area, and first ends of the second optical fibers are terminated at the aggregation box for coupling with corresponding ones of the first optical fibers of the riser cable terminated at the aggregation box;

a drop box located in the vicinity of each floor or each area of a single floor where units served by the second optical fibers of the feeder cables are located, and each drop box is constructed and arranged to terminate second ends of the second optical fibers of a corresponding feeder cable; and a number of drop cables or fibers routed between a given drop box and the units that are served by the second optical fibers of the corresponding feeder cable terminated at the given drop box, a first end of each drop cable is terminated at the drop box for coupling with a second optical fiber of the feeder cable which fiber serves a given unit, and a second end of the drop cable is terminated at the site of the given unit, wherein at least one of the drop and the aggregation boxes includes:

a base constructed and arranged for mounting on a wall or other surface at the building;

a cylindrical drum region having an axis normal to the base and extending a certain height axially above the base and including;

(a) an outer cylindrical wall dimensioned and formed to support a length of a first fiber optic cable when wound about said wall, (b) an inner cylindrical wall formed radially inward of the outer wall, wherein the inner and the outer cylindrical walls are each fixed at one axial end to the base and an annular fiber routing region is defined between the inner and the outer walls, and (c) a first cable entry port formed in the outer cylindrical wall for receiving an inside end portion of the first fiber optic cable so that optical fibers of the cable can be routed through the fiber routing region; and an interface compartment disposed atop the drum, wherein said compartment is constructed and arranged for interfacing a first set of fibers that are routed within the compartment, with a second set of fibers associated with a second fiber optic cable that is routed to the drop box.

2. The system of claim 1, wherein each riser cable comprises a ribboned fiber optic cable.

3. The system of claim 1, wherein the feeder cables comprise ribboned fiber optic cables.

4. The system of claim 1, wherein at least one of the riser and the feeder cables are terminated with multifiber array connectors.

5. The system of claim 1, wherein said at least one of the drop and the aggregation boxes includes a tube having an axial passage that is sufficiently wide to receive an elongated tool so that the apparatus can turn freely about the tool when the first fiber optic cable is paid out from the drum region of the apparatus.

6. The system of claim 5, wherein the tube is supported to extend between a bottom end whereat the tube passage opens beneath said base, and a top end whereat the passage opens on a top surface of the interface compartment.

7. The system of claim 5, wherein the tube is supported so that the axis of said passage coincides with the axis of the outer cylindrical wall of the drum region.

8. The system of claim 1, wherein the interface compartment of said at least one of the drop and the aggregation boxes includes a connector panel, and a number of connector adapters mounted in the panel for coupling fiber optic connectors at an externally facing side of the panel, with corresponding fiber optic connectors at an internally facing side of the panel.

9. The system of claim 8, wherein the interface compartment is constructed and arranged to support the connector panel so that a first connector panel can be removed and exchanged with a second connector panel having connector adapters of a type different from the type of adapters mounted in the first connector panel.

10. The system of claim 8, wherein one or more of the adapters mounted in the connector panel of the interface compartment are constructed and arranged to couple multifiber type connectors with one another.

11. The system of claim 1, wherein the interface compartment of said at least one of the drop and the aggregation boxes has a side wall, and the side wall has a second cable entry port for receiving a fiber optic cable or cable assembly having a third set of fibers to be coupled via the connector panel with the second set of fibers of the second fiber optic cable routed to the box.

12. The system of claim 1, including a length of the first fiber optic cable wound about the outer cylindrical wall of the drum region, and a fiber optic connector for terminating an outside end of the cable.

* * * * *